US010871194B2

(12) United States Patent
Burke

(10) Patent No.: US 10,871,194 B2
(45) Date of Patent: Dec. 22, 2020

(54) SWITCHABLE RATCHETING WEDGE CLUTCH

(71) Applicant: Schaeffler Technologies AG & Co. KG, Herzogenaurach (DE)

(72) Inventor: Peter Burke, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 129 days.

(21) Appl. No.: 16/263,094

(22) Filed: Jan. 31, 2019

(65) Prior Publication Data
US 2020/0248762 A1 Aug. 6, 2020

(51) Int. Cl.
F16D 41/16 (2006.01)
F16D 41/04 (2006.01)
F16D 41/14 (2006.01)
F16D 13/18 (2006.01)

(52) U.S. Cl.
CPC ............. F16D 41/16 (2013.01); F16D 13/18 (2013.01); F16D 41/04 (2013.01); F16D 41/14 (2013.01)

(58) Field of Classification Search
CPC .... F16D 41/12–14; F16D 15/00; F16D 13/18; F16D 41/16; F16D 41/04
See application file for complete search history.

(56) References Cited

U.S. PATENT DOCUMENTS

| 4,116,314 | A | * | 9/1978 | Ackerman | ............... F16D 41/12 192/35 |
| 6,109,410 | A | | 8/2000 | Costin | |
| 6,244,965 | B1 | | 6/2001 | Klecker et al. | |
| 6,481,551 | B1 | | 11/2002 | Ruth | |
| 7,448,481 | B2 | | 11/2008 | Kimes et al. | |
| 8,042,670 | B2 | | 10/2011 | Bartos et al. | |
| 9,109,636 | B2 | | 8/2015 | Kimes et al. | |
| 9,121,454 | B2 | | 9/2015 | Pawley | |
| 2010/0122883 | A1 | | 5/2010 | Bartos et al. | |
| 2014/0262677 | A1 | | 9/2014 | Beylotte et al. | |
| 2014/0332335 | A1 | * | 11/2014 | Strong | .................... F16D 15/00 192/43 |
| 2017/0356508 | A1 | * | 12/2017 | Usami | .................... B62M 11/02 |
| 2018/0038425 | A1 | * | 2/2018 | Kimes | ................... F16D 27/102 |

(Continued)

FOREIGN PATENT DOCUMENTS

CN 107747600 A * 3/2018
KR 10-2014-0066755 A 6/2014

Primary Examiner — Ernesto A Suarez
Assistant Examiner — Lillian T Nguyen

(57) ABSTRACT

A clutch, including: an inner race including a pocket; an outer race; and a pawl including a portion disposed in the pocket and pivotable within the pocket. In a locked mode of the switchable ratcheting clutch: the pawl contacts the outer race; and the pawl, the inner race, and the outer race are non-rotatably connected. In a one-way mode of the switchable ratcheting clutch: the pawl contacts the outer race; and relative rotation of the inner race around the axis of rotation and with respect to the outer race is enabled only in a first circumferential direction. In a freewheel mode of the switchable ratcheting clutch: the pawl is free of contact with the outer race; and the inner race is rotatable around the axis of rotation and with respect to the outer race in the first circumferential direction and in a second circumferential direction, opposite the first circumferential direction.

20 Claims, 12 Drawing Sheets

(56) References Cited

U.S. PATENT DOCUMENTS

| | | |
|---|---|---|
| 2018/0266502 A1 | 9/2018 | Shioiri et al. |
| 2018/0274604 A1 | 9/2018 | Ince et al. |
| 2020/0182311 A1* | 6/2020 | Burke ................... F16D 41/04 |
| 2020/0309205 A1* | 10/2020 | Burke ................... F16D 41/16 |

* cited by examiner

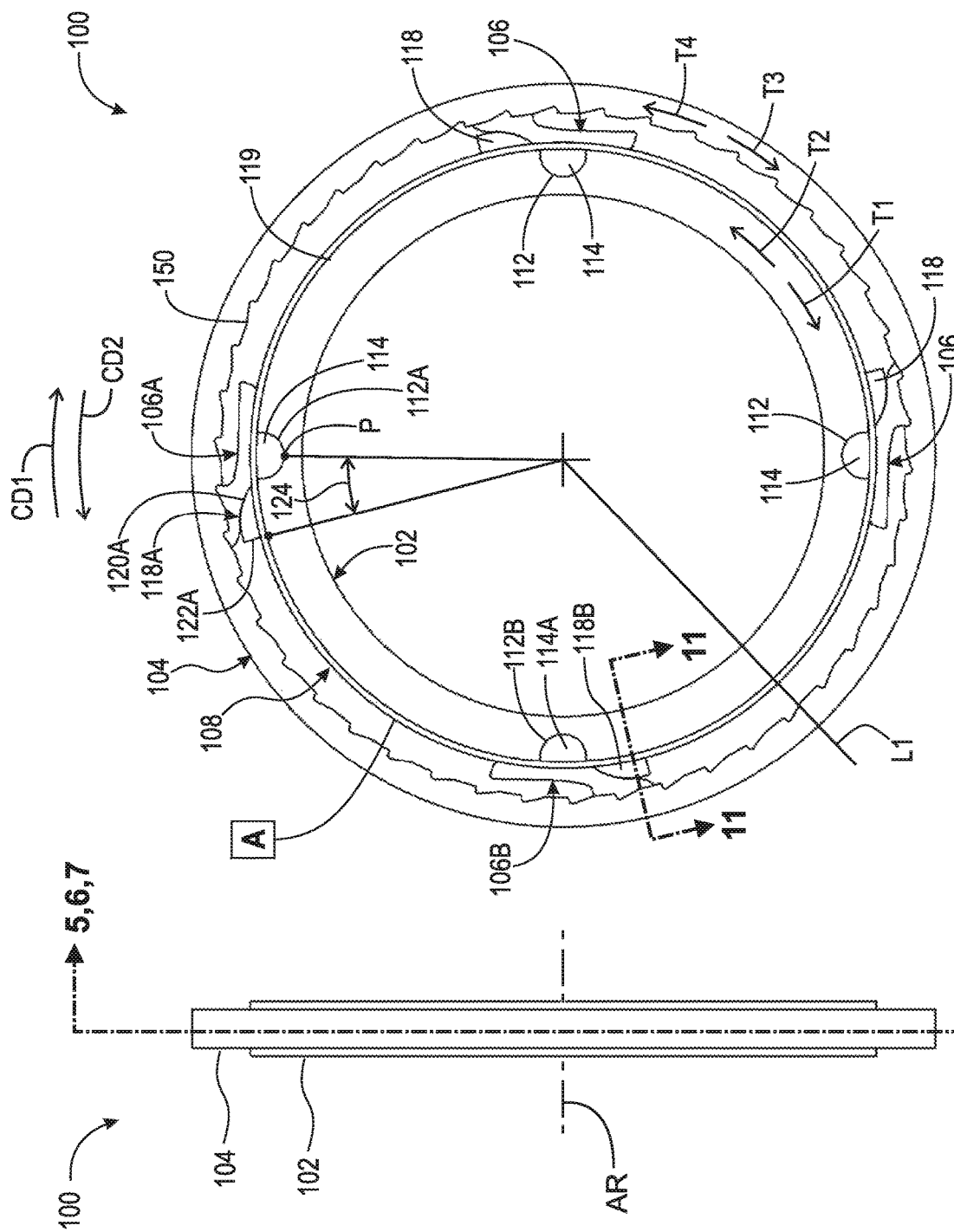

SWITCHABLE RATCHETING WEDGE CLUTCH

TECHNICAL FIELD

The present disclosure relates to a ratcheting wedge clutch switchable among locked, one-way, and freewheel modes.

BACKGROUND

Ratcheting clutches, operating in one-way mode or freewheel mode, are known.

SUMMARY

According to aspects illustrated herein, there is provided a switchable ratcheting clutch, including: an axis of rotation; an inner race including a pocket; an outer race; and a pawl including a portion disposed in the pocket and pivotable within the pocket. In a locked mode of the switchable ratcheting clutch: the pawl contacts the outer race; and the pawl, the inner race, and the outer race are non-rotatably connected. In a one-way mode of the switchable ratcheting clutch: the pawl contacts the outer race; and relative rotation of the inner race around the axis of rotation and with respect to the outer race is enabled only in a first circumferential direction. In a freewheel mode of the switchable ratcheting clutch: the pawl is free of contact with the outer race; and the inner race is rotatable around the axis of rotation and with respect to the outer race in the first circumferential direction and in a second circumferential direction, opposite the first circumferential direction.

According to aspects illustrated herein, there is provided a switchable ratcheting clutch, including: an axis of rotation; an inner race including a pocket; an outer race; a cage radially disposed between the inner race and the outer race and including a ramp sloping radially inwardly in a first circumferential direction around the axis of rotation; and a pawl including a portion disposed in the pocket and pivotable around a pivot axis parallel to the axis of rotation and passing through the portion, a first circumferential end, and a second circumferential end. In a locked mode of the switchable ratcheting clutch: the ramp contacts the pawl; the first circumferential end contacts the outer race; and the inner race and the outer race are non-rotatably connected. In a one-way mode of the switchable ratcheting clutch: the second circumferential end contacts the outer race; and relative rotation of the inner race around the axis of rotation and with respect to the outer race is enabled only in a second circumferential direction, opposite the first circumferential direction. In a freewheel mode of the switchable ratcheting clutch: the pawl is free of contact with the outer race; and the inner race is rotatable, with respect to the outer race, in the first circumferential direction and in the second circumferential direction. The cage is arranged to be rotated, around the axis of rotation and with respect to the inner race, by an actuator to switch the switchable ratcheting clutch among the locked mode, the one-way mode, and the freewheel modes.

According to aspects illustrated herein, there is provided a switchable ratcheting clutch, including: an axis of rotation; an inner race including a pocket and a radially outermost surface; an outer race; a cage radially disposed between the inner race and the outer race and including a ramp sloping radially inwardly in a first circumferential direction; a pawl including a portion pivotably disposed in the pocket, a first circumferential end, and a second circumferential end; and a resilient element in contact with the inner race and the first circumferential end, and urging the pawl around a pivot axis passing through the portion of the pawl and parallel to the axis of rotation. In a locked mode of the switchable ratcheting clutch: the cage is in a first circumferential position around the axis of rotation and with respect to the inner race; the ramp contacts the pawl; the second circumferential end of the pawl contacts the outer race; and the inner race and the outer race are non-rotatably connected. In a one-way mode of the switchable ratcheting clutch: the cage is in a second circumferential position around the axis of rotation and with respect to the inner race; the first circumferential end of the pawl contacts the outer race; and relative rotation of the inner race around the axis of rotation and with respect to the outer race is enabled only in a second circumferential direction, opposite the first circumferential direction. In a freewheel mode of the switchable ratcheting clutch: the cage is in a third circumferential position around the axis of rotation and with respect to the inner race; the ramp contact the pawl; and the inner race is rotatable with respect to the outer race in the first circumferential direction and in the second circumferential direction. The cage is arranged to be rotated, around the axis of rotation and with respect to the inner race, by an actuator to switch the switchable ratcheting clutch among the locked mode, the one-way mode, and the freewheel modes.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 1 is a side view of a switchable ratcheting clutch;

FIG. 2 is a front view of the switchable ratcheting clutch shown in FIG. 1 in a locking mode;

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

FIG. 1 is a side view of switchable ratcheting clutch 100.

FIG. 2 is a front view of switchable ratcheting clutch 100 shown in FIG. 1 in a locking mode.

Figure 3:
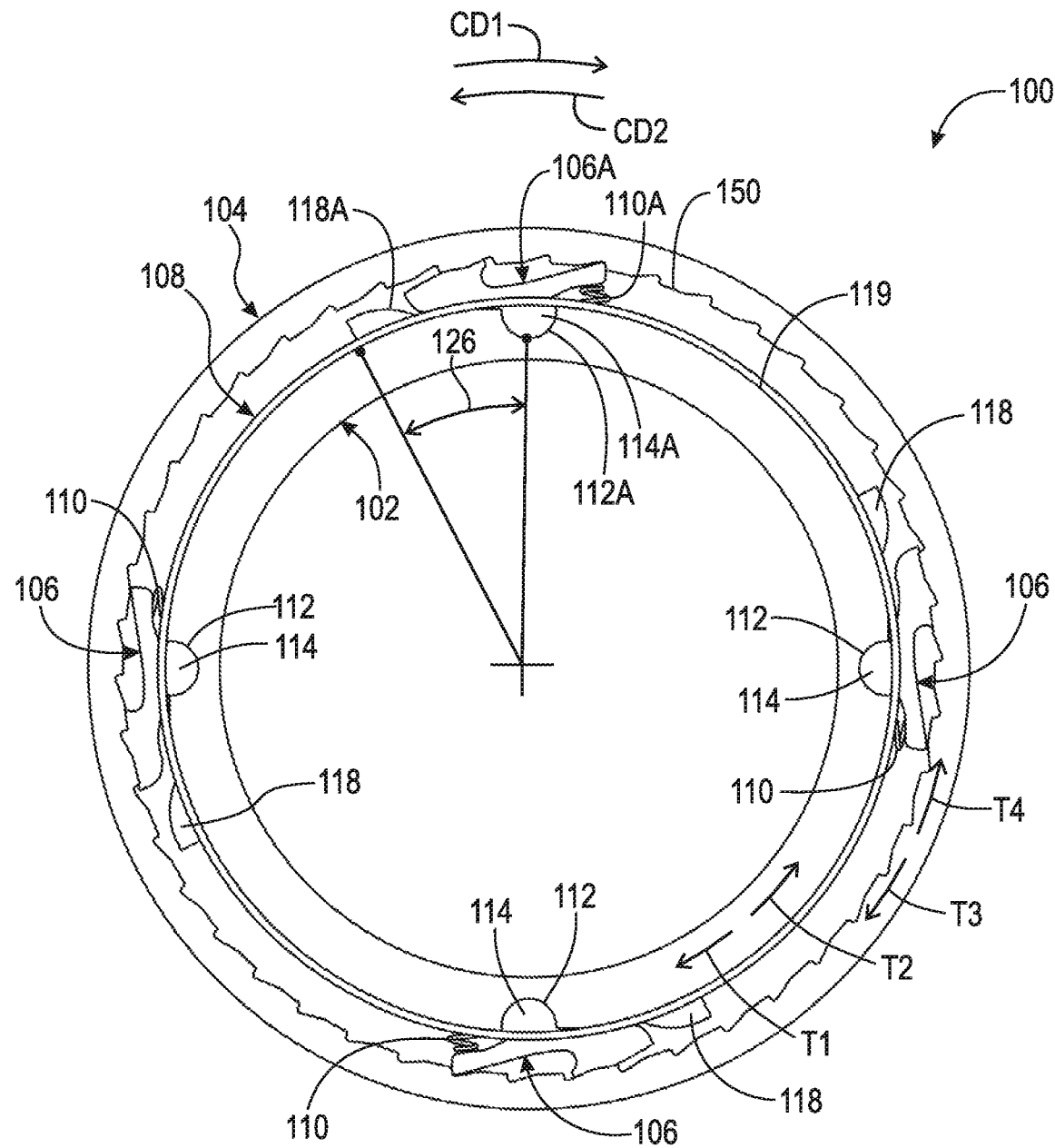
FIG. 3 is a front view of the switchable ratcheting clutch shown in FIG. 1 in a one-way mode.

FIG. 3 is a front view of switchable ratcheting clutch 100 shown in FIG. 1 in a one-way mode.

Figure 4:
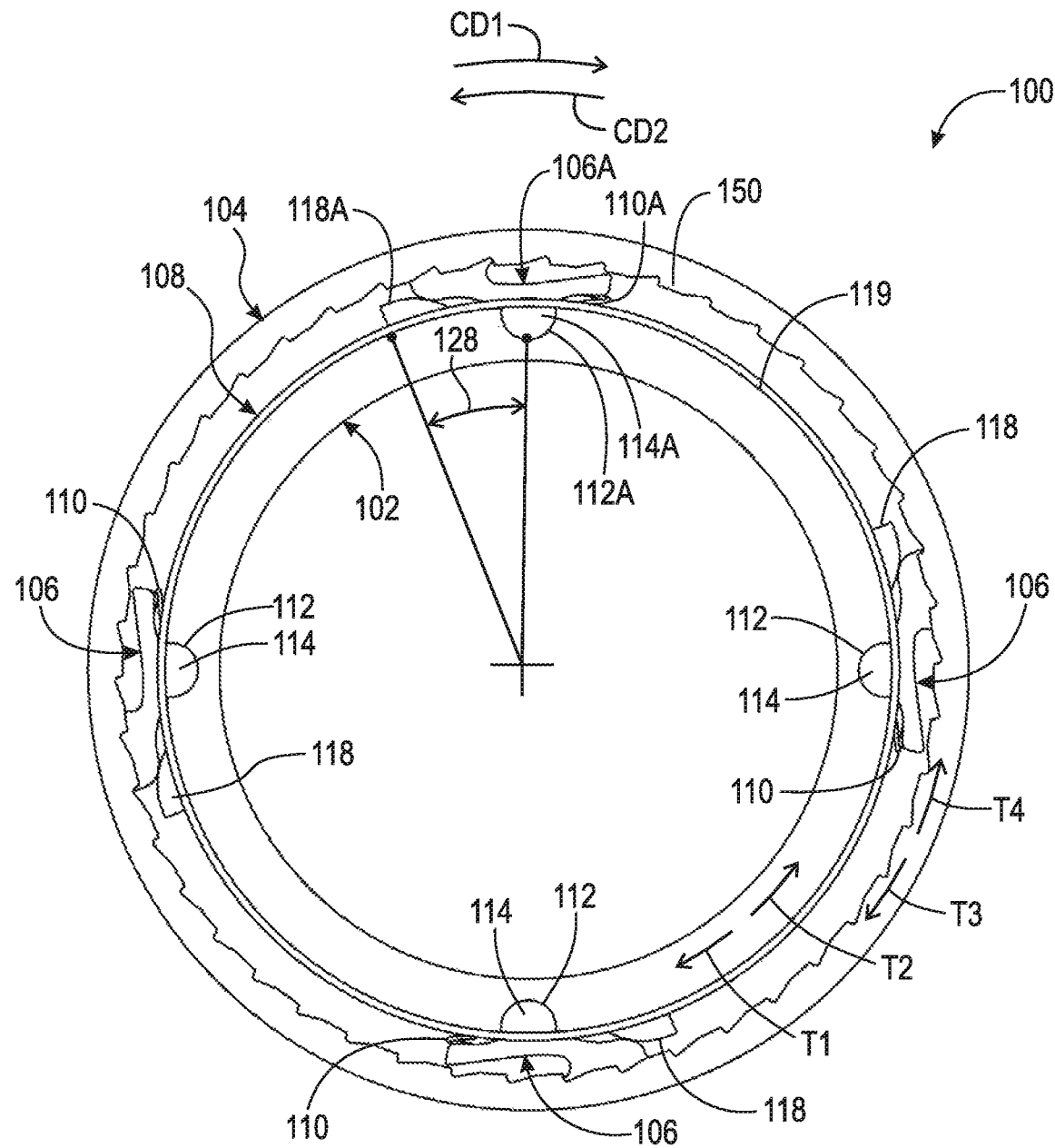
FIG. 4 is a front view of the switchable ratcheting clutch shown in FIG. 1 in a freewheel mode.

FIG. 4 is a front view of switchable ratcheting clutch 100 shown in FIG. 1 in a freewheel mode. The following should be viewed in light of FIGS. 1 through 4. Switchable ratcheting clutch 100 includes: axis of rotation AR; inner race 102; outer race 104; pawls 106; cage 108; and resilient elements 110. Inner race 102 includes indentations 111 and pockets 112. Resilient elements 110 are partly located in indentations 111 and are engaged with inner race 102 and pawls 106. In the example of FIG. 1, elements 110 are in contact with inner race 102 and pawls 106. Each pawl 106 includes portion 114 disposed in a respective pocket 112. Cage 108 is radially disposed between inner race 102 and outer race 104 so that line L1, originating at axis AR and orthogonal to axis AR, passes through in sequence: inner race 102, cage 108, and outer race 104. Stated otherwise, inner race 102, cage 108, and outer race 104 are sequentially aligned, or positioned, radially outwardly.

Figure 5:
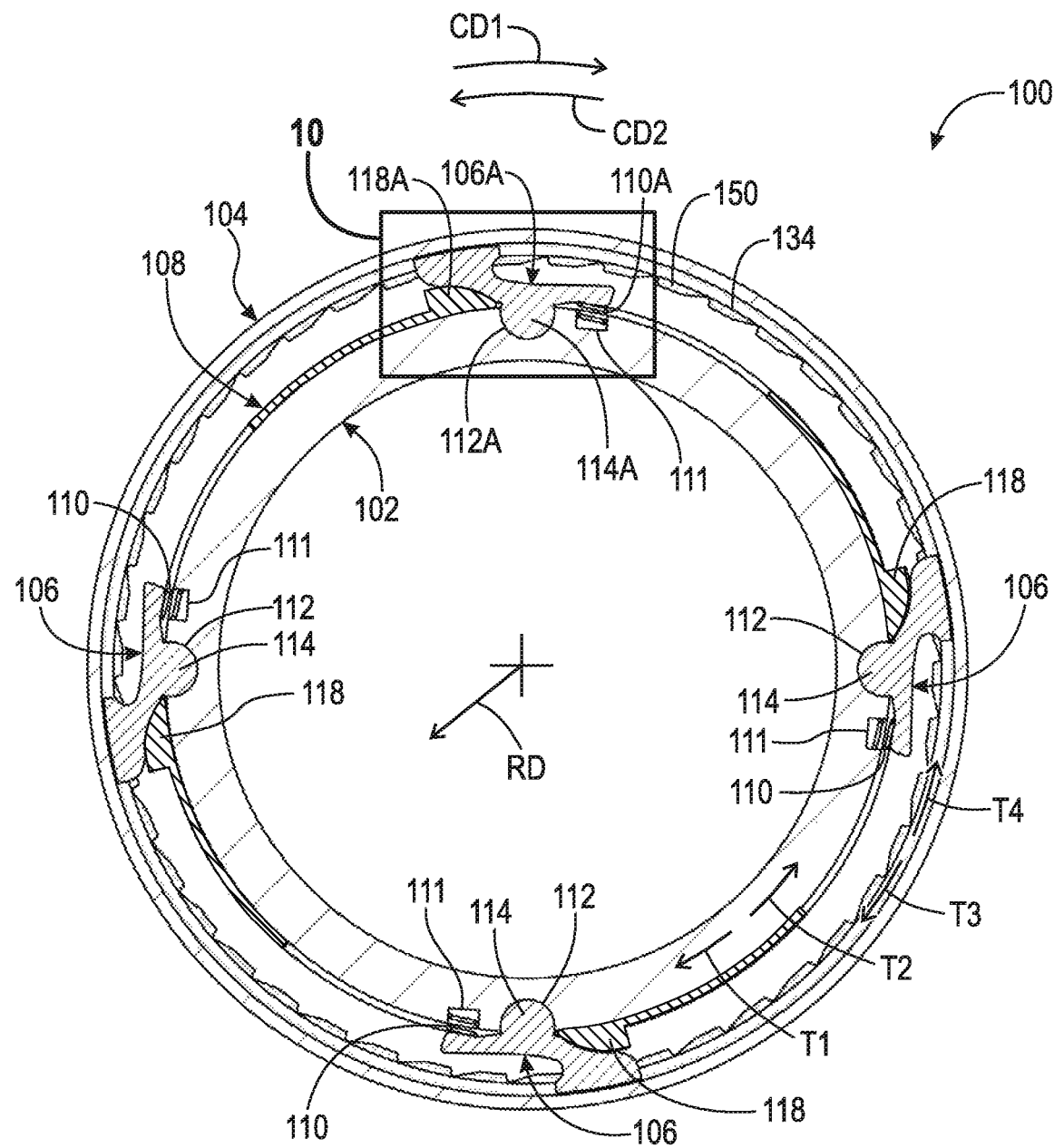
FIG. 5 is a cross-sectional view generally along line 5,6,7-5,6,7 in FIG. 1 with the switchable ratcheting clutch in the locked mode.

FIG. 5 is a cross-sectional view generally along line 5,6,7-5,6,7 in FIG. 1 with switchable ratcheting clutch 100 in the locked mode.

Figure 6:
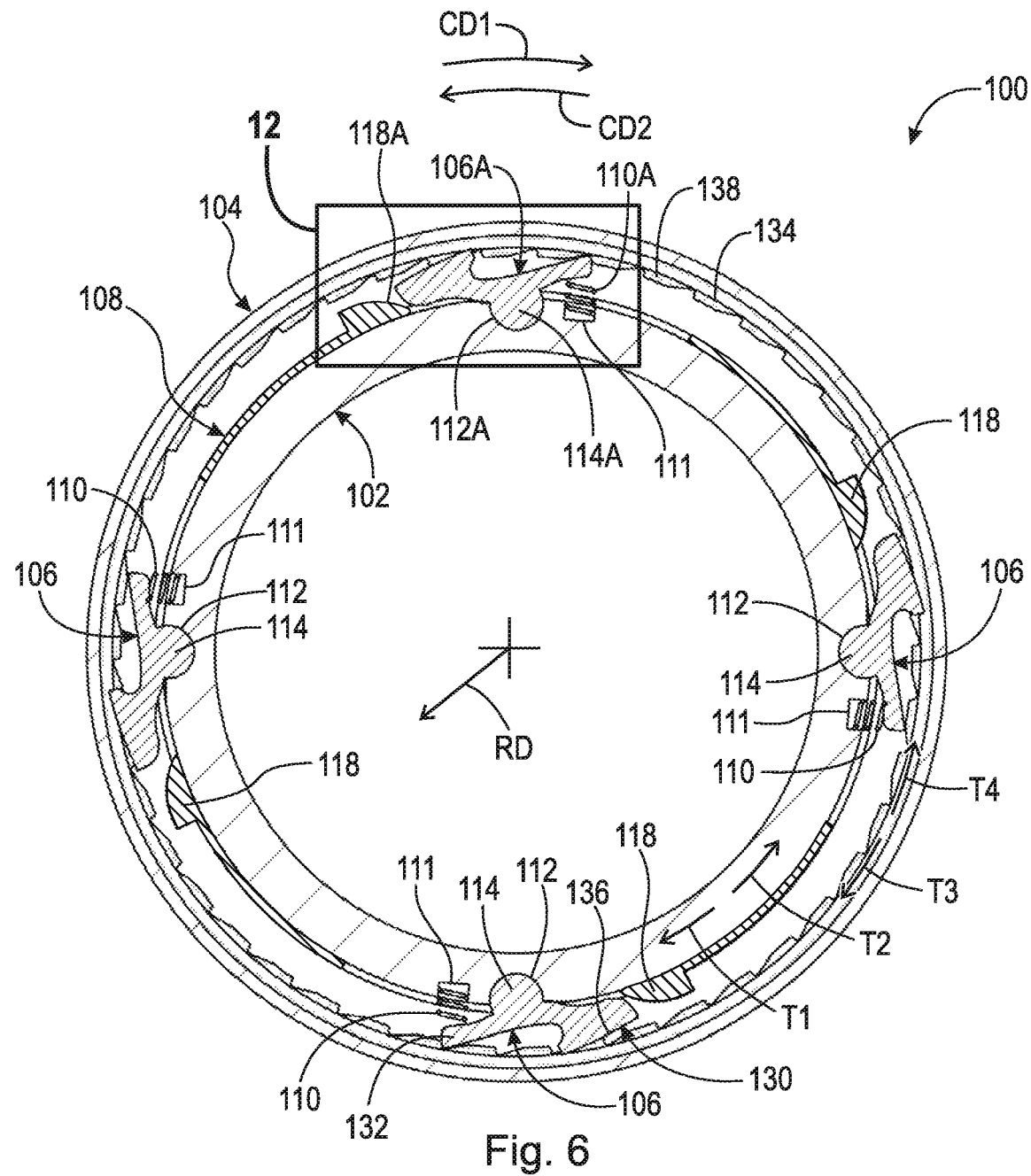
FIG. 6 is a cross-sectional view generally along line 5,6,7-5,6,7 in FIG. 1 with the switchable ratcheting clutch n in the one-way mode.

FIG. 6 is a cross-sectional view generally along line 5,6,7-5,6,7 in FIG. 1 with switchable ratcheting clutch 100 in the one-way mode.

Figure 7:
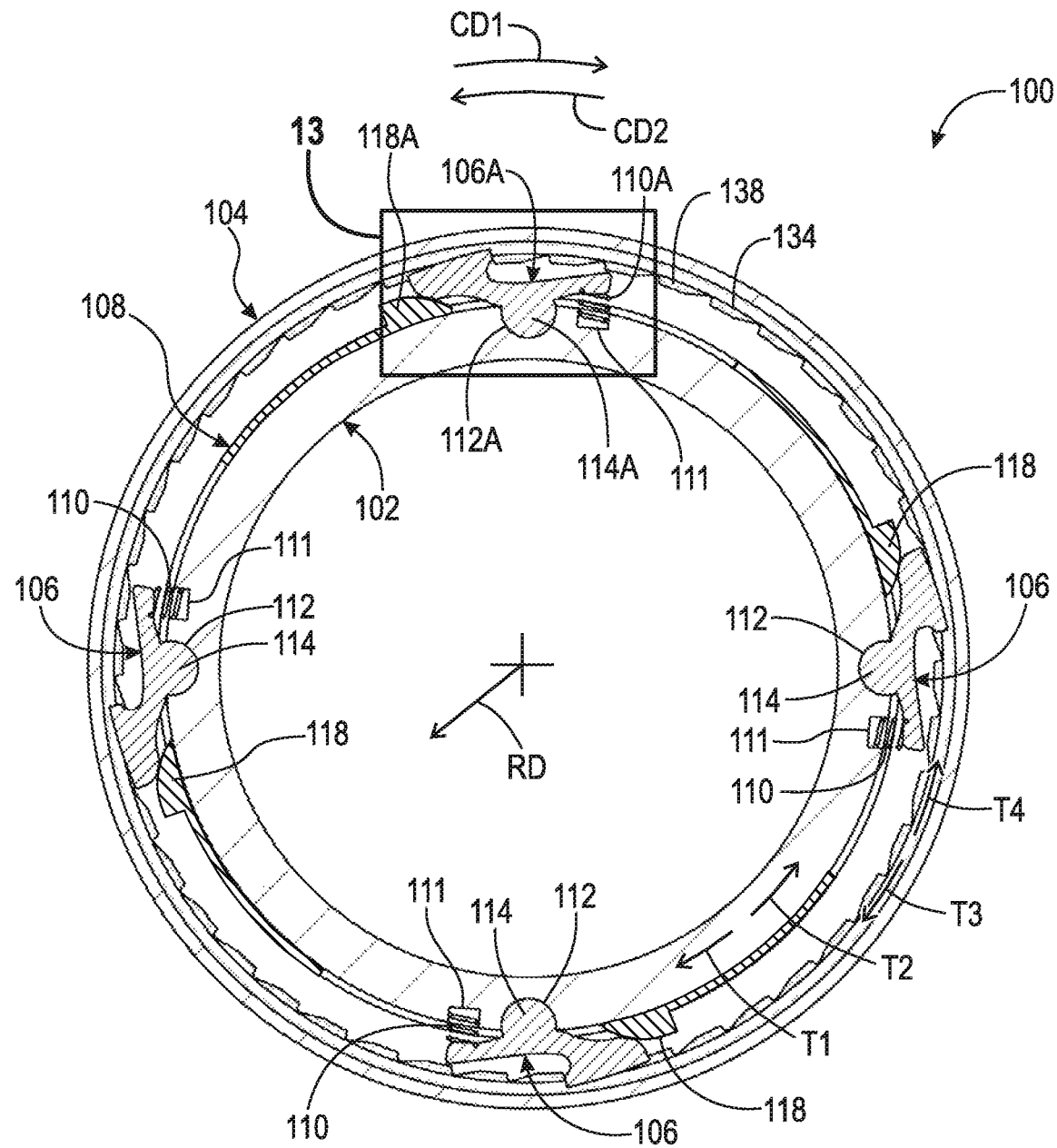
FIG. 7 is a cross-sectional view generally along line 5,6,7-5,6,7 in FIG. 1 with the switchable ratcheting clutch in the freewheel mode.

FIG. 7 is a cross-sectional view generally along line 5,6,7-5,6,7 in FIG. 1 with switchable ratcheting clutch 100 in the freewheel mode. The following should be viewed in light of FIGS. 1 through 7. Pivot axis PA are: parallel to axis AR; pass through portions 114; and pass through pockets 112. For example, an axis PA passes through pocket 112A and portion 114A. Portions 114 are fixed with respect to inner race 102 in opposite circumferential directions CD1 and CD2 around axis AR. By "around axis AR" we mean that directions CD1 and CD2 identify directions of rotation around axis AR. Portions 114 are radially fixed with respect to inner race 102. Thus, portions 114 are pivotable about axis PA within pockets 112, but cannot be displaced, with respect to inner race 102, circumferentially or radially inwardly or outwardly.

Clutch 100 has three operating modes: a locked mode; a one-way mode; and a freewheel mode. In the locked mode: pawls 106 contact outer race 104; and inner race 102 and outer race 104 are non-rotatably connected. For example, inner race 102 and outer race 104 are non-rotatably connected for: torque T1 applied to inner race 102 in circumferential direction CD1; torque T2 applied to inner race 102 in circumferential direction CD2, opposite direction CD1; torque T3 applied to outer race 104 in circumferential direction CD1; and torque T4 applied to outer race 104 in circumferential direction CD2.

By "non-rotatably connected" components, we mean that: the components are connected so that whenever one of the components rotates, all the components rotate; and relative rotation between the components is not possible. Radial and/or axial movement of non-rotatably connected components with respect to each other is possible, but not required.

In the one-way mode: pawls 106 contact outer race 104; relative rotation of inner race 102 around axis of rotation AR and with respect to outer race 104 is enabled only in circumferential direction CD2; and inner race 102 and outer race 104 are non-rotatably connected for a torque applied to inner race 102 in direction CD1, for example torque T1, or a torque applied to outer race 104 in direction CD2, for example torque T4. For example: when torque T2 is applied, inner race 102 rotates in direction CD2 with respect to outer race 104; and when torque T4 is applied, outer race 104 rotates in direction CD1 with respect to inner race 102.

In the freewheel mode: pawls 106 are free of contact with outer race 104; and rotation between inner race 102 and outer race 104 in both circumferential direction CD1 and circumferential direction CD2 is enabled. Clutch 100 is arranged to transition from the locked mode or the freewheel mode to the one-way mode for torque T1 or torque T4. Stated otherwise, clutch 100 is arranged to transition from the locked mode or the freewheel mode to the one-way mode for relative rotation of inner race 102 with respect to outer race 104 in direction CD1.

Figure 8:
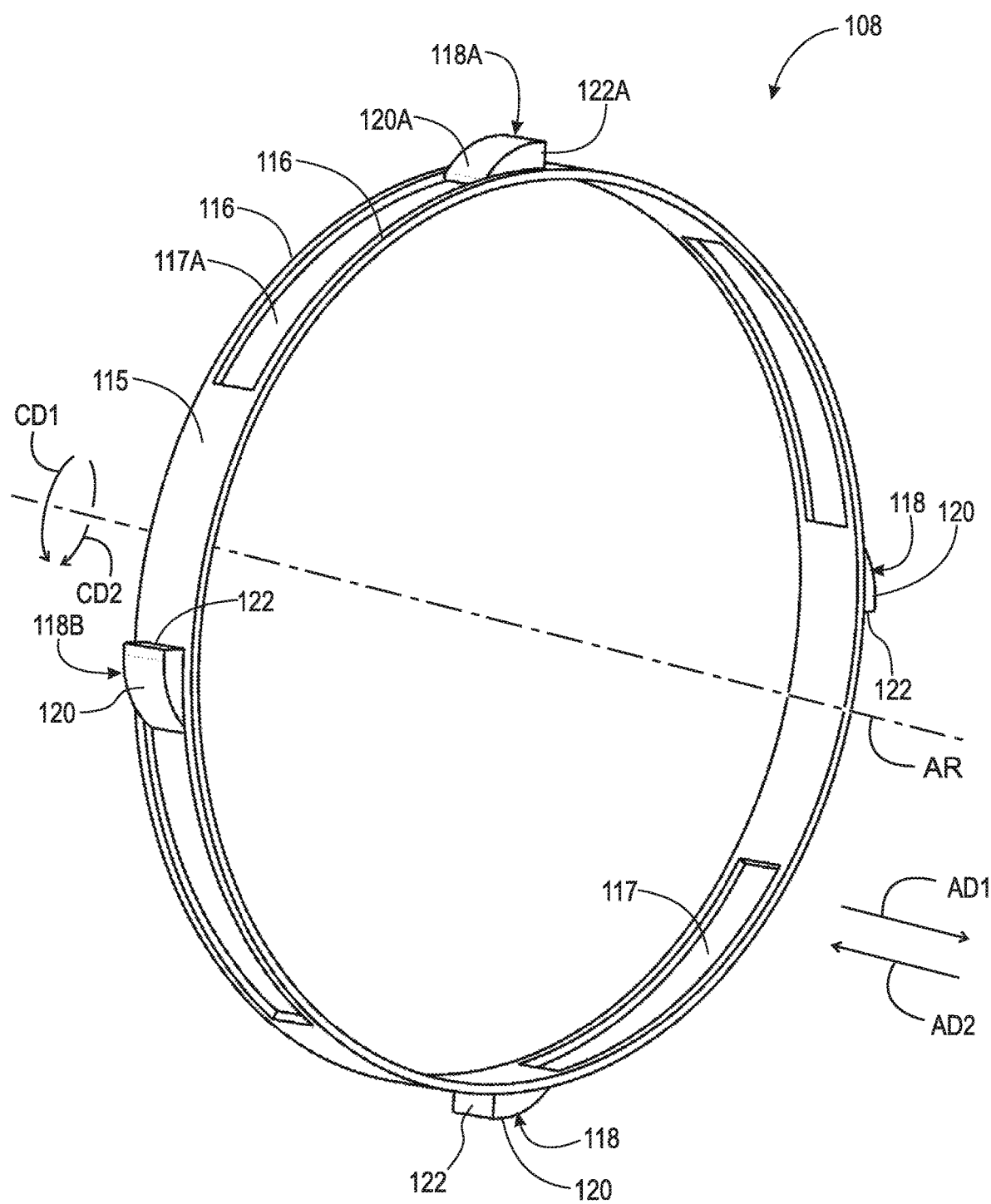
FIG. 8 is a back isometric view of a cage of the switchable ratcheting clutch shown in FIG. 1.

FIG. 8 is a back isometric view of cage 108 of switchable ratcheting clutch 100 shown in FIG. 1. The following should be viewed in light of FIGS. 1 through 8. Cage 108 is continuous in directions CD1 and CD2. For example, cage 108 includes: solid portions 115; strip portions 116; and openings 117. Strip portions 116 connect respective solid portions 115 and bound openings 117 in opposite axial directions AD1 and AD2, parallel to axis AR. Cage 108 includes ramps 118. In an example embodiment, ramps 118 are integral to cage 108. Cage 108 contacts radially outer surface 119 of inner race 102. Pawls 106 extend through respective openings 117. For example, pawl 106A extends through opening 117A. Each ramp 118 includes: ramp surface 120 sloping radially inwardly in direction CD1; and end 122 facing in direction CD2. Cage 108 and ramps 118 are arranged to be rotated by actuator A in directions CD1 and CD2, with respect to inner race 102, to switch clutch 100 among the locked, one-way, and freewheel modes. Actuator A is schematically shown in FIG. 2. In an example, embodiment, clutch 100 includes actuator A. Actuator A can be any actuator known in the art.

In general, a reference character "[number][number][number][letter]" designates a specific example of an element labeled as "[number][number][number]." For example, pawl 106A is a specific example from among pawls 106.

Cage 108 and ramps 118 are rotated by actuator A into first, second, and third circumferential positions, around axis AR and with respect to inner race 102, for the locked, one-way, and freewheel modes, respectively. The first, second, and third circumferential positions are different from each other. For example, using pocket 112A as a fixed circumferential reference point for inner race 102 (i.e., twelve o'clock in FIGS. 2 through 7), and end 122A of ramp 118A as a point of reference for cage 108 and ramps 118: in the locked mode shown in FIGS. 2 and 5, pocket 112A and end 122A are separated by angle 124 in direction CD2; in the one-way mode shown in FIGS. 3 and 6, pocket 112A and end 122A are separated by angle 126 in direction CD2; and in the freewheel mode shown in FIGS. 4 and 7, pocket 112A and end 122A are separated by angle 128 in direction CD2. Angles 124, 126, and 128 are different from each other. For example, angle 126 is greater than angle 128, and angle 128 is greater than angle 124. Thus: the third circumferential position of cage 108 and ramps 118 shown in FIGS. 4 and 7 is between the second circumferential position of cage 108 and ramps 118 shown in FIGS. 3 and 6 and the first circumferential position of cage 108 shown in FIGS. 2 and 5.

Figure 9:
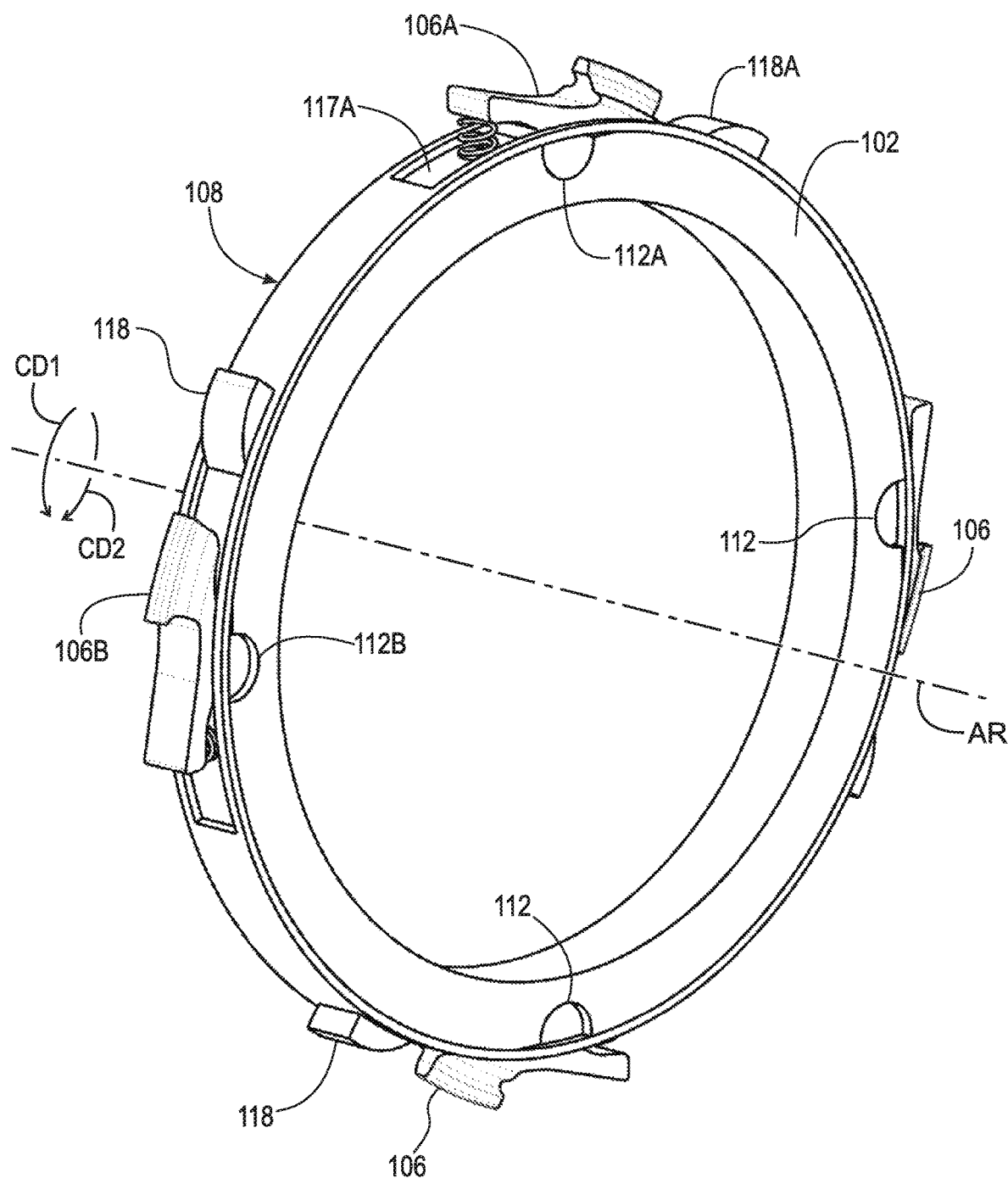
FIG. 9 is a back isometric view of the switchable ratcheting clutch shown in FIG. 3 with an outer race removed.

FIG. 9 is a back isometric view of switchable ratcheting clutch 100 shown in FIG. 3 with outer race 104 removed.

Figure 10:
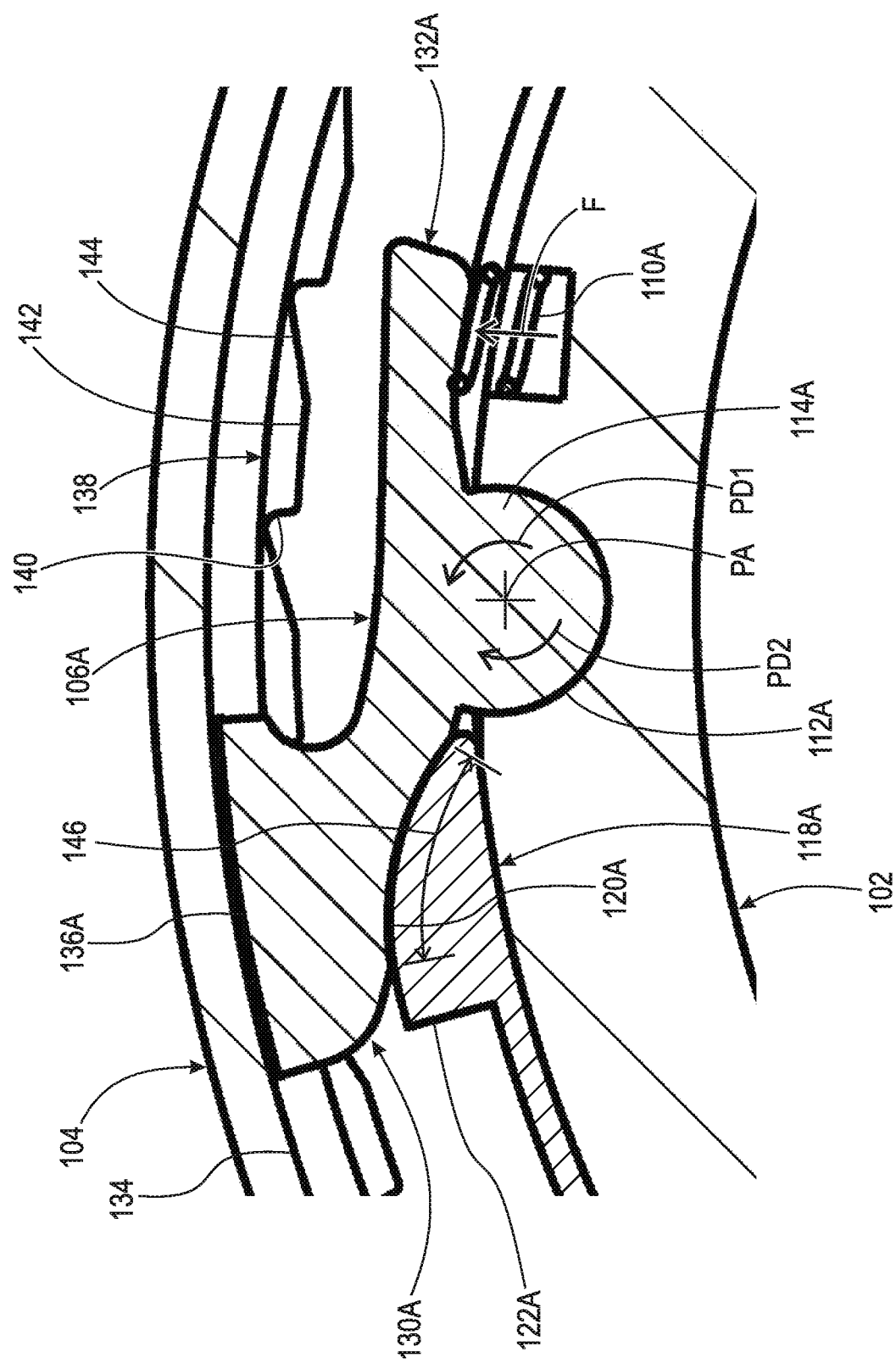
FIG. 10 is a detail of area 10 in FIG. 5.

FIG. 10 is a detail of area 10 in FIG. 5.

Figure 11:
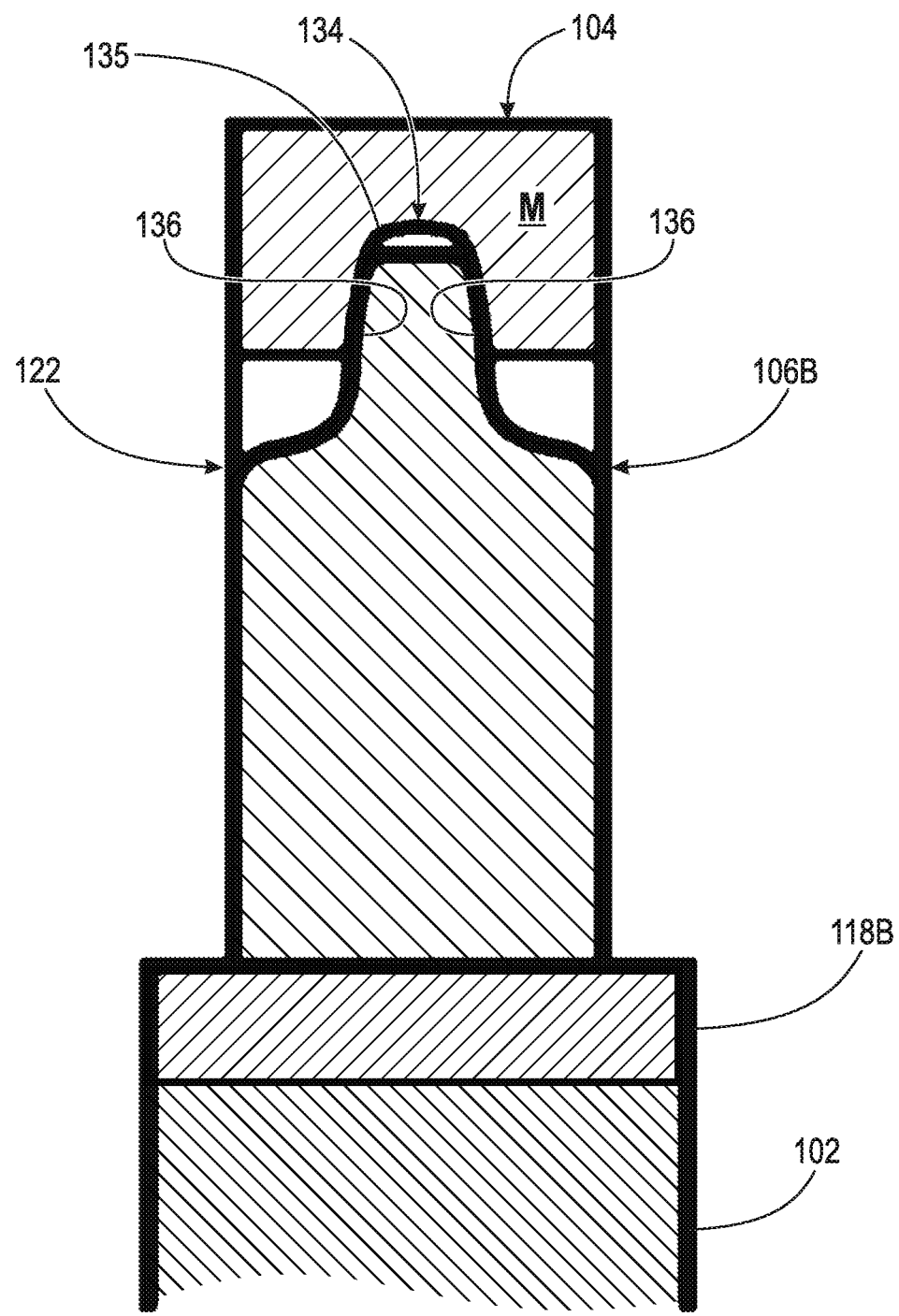
FIG. 11 is a cross-sectional view generally along line 11-11 in FIG. 2.

FIG. 11 is a cross-sectional view generally along line 11-11 in FIG. 2.

Figure 12:
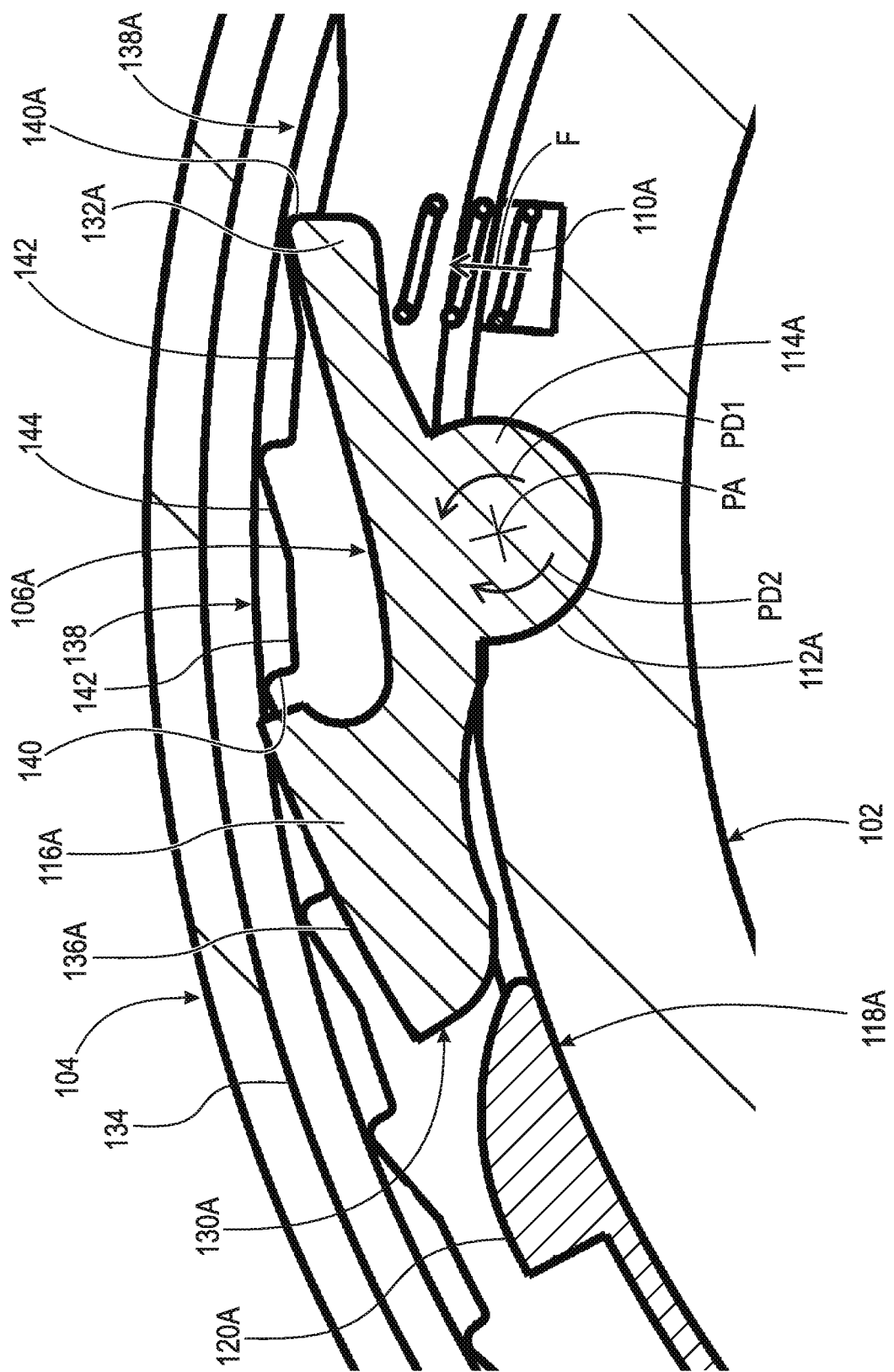
FIG. 12 is a detail of area 12 in FIG. 6.

FIG. 12 is a detail of area 12 in FIG. 6.

Figure 13:
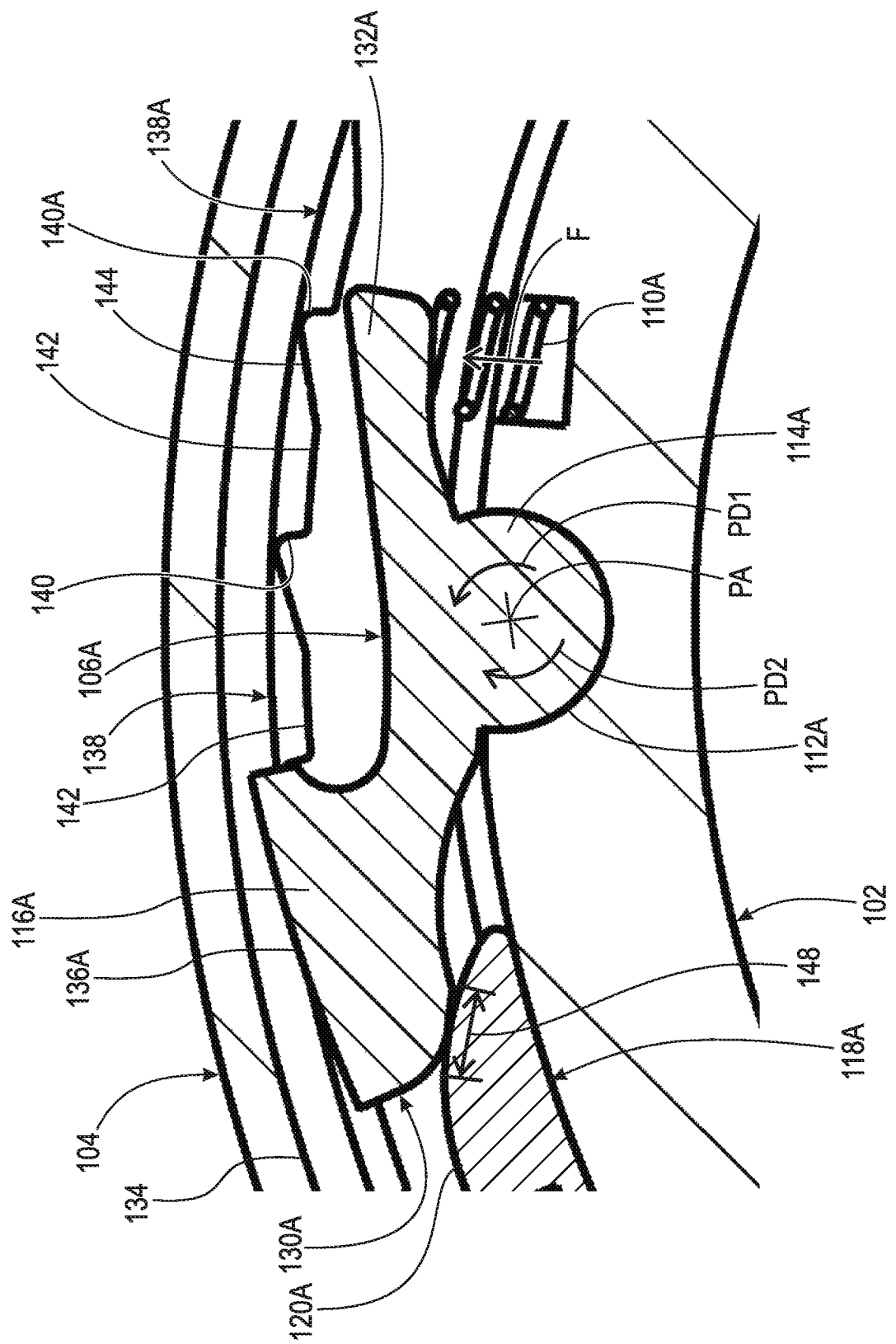
FIG. 13 is a detail of area 13 in FIG. 7.

FIG. 13 is a detail of area 13 in FIG. 7. The following should be viewed in light of FIGS. 1 through 13 and provides further detail regarding the structure and operation of clutch 100. Pawls 106 include circumferential ends 130 and 132. Pawls 106 are pivotable about axis PA in opposite pivot direction PD1 and PD2. Resilient elements 110 urge pawls 106 with force F in direction PD1 about axis PA. Pawls 106 are in first, second, and third pivot, or circumferential, positions with respect to pivot axis PA and in direction PD1, for the locked, one-way, and freewheel modes, respectively. The three pivot or circumferential positions are different from each other. For example, using end 132A on pawl 106A as a reference, it is clear that: in the one-way mode, pawl 106A is pivoted further around axis PA in direction PD1 than in the freewheel or locked modes; and in the freewheel mode, pawl 106A is pivoted further around axis PA in direction PD1 than in the locked mode. Stated otherwise, the circumferential positions of pawls 106 refer to different degrees of rotation of pawls 106 about axis PA.

In an example embodiment: outer race 104 includes circumferentially disposed groove 134 opening radially inwardly, extending radially outwardly into outer race 104, and bounded circumferentially (in directions CD1 and CD2) and radially outwardly in direction RD by wall 135 in material M forming outer race 104; and ends 130 includes surfaces 136.

The discussion below is directed to: pawl 106A; resilient element 110A; pocket 112A; and ramp 118A; however it should be understood that the discussion is applicable to the entirety of clutch 100, for example to each grouping of a pawl 106, a respective pocket 112 in which portion 114 of the pawl 106 is located; and a respective ramp 118 arranged to contact the pawl. In the locked mode: ramp surface 120A contacts end 130A and pivots pawl 106A in direction PD2; end 132A compresses resilient element 110A against force F; surface 136A of circumferential end 132A is pivoted in direction PD2 to contact and non-rotatably connect to wall 135; and ramp 118A prevents resilient element 110A and force F from pivoting pawl 106A in direction PD1.

In an example embodiment, outer race 104 includes protrusions 138. Protrusions 138: are axially off-set from groove 134; extend radially inwardly; and include surfaces 140 facing at least partly in direction CD2. To shift from the locked mode to the one-way mode: actuator A rotates cage 108 and ramp 118A, with respect to inner race 102, in direction CD2; ramp surface 120A slides along end 130A in direction CD2 and disengages from pawl 106A; force F of resilient element 110A pivots pawl 106A in direction PD1; surface 136A disengages from wall 135; and end 132A contacts surface 140A of protrusion 138A. Torque T1 urges end 132A into contact with protrusion 138A and surface 140A, and torque T4 urges protrusion 138A and surface 140A into contact with end 132A. For torque T2 or T3, pawls 106 "ratchet" along protrusions 138. For example, ends 132 slide along surface 142 (facing radially inwardly) and surface 144 (facing at least partly in direction CD1) of protrusions 138 without being blocked by surface 142 and 144, since surfaces 142 and 144 do not face in direction CD2. Thus, in the one-way mode, ends 132 are either in contact with at least one surface 140, surface 142, or surface 144.

To shift from the locked mode to the freewheel mode: actuator A rotates cage 108 and ramp 118A in direction CD2; surface 120A slides along end 130A in direction CD2; surface 120A remains in contact with end 130A; force F of resilient element 110A pivots pawl 106A in direction PD1; surface 136A disengages from wall 135; and end 132A remains free of contact with race 104, in particular with protrusions 138. Ramp 118A blocks further pivoting of pawl 106A in direction PD1, to prevent end 132A from contacting protrusions 138. Further, force F urges end 130A into contact with ramp 118A, fixing the position of pawl 106A about axis PA and preventing unintentional pivoting of pawl 106A about axis PA and unintentional contact between pawl 106A and outer race 104. Thus, pawl 106A does not engage outer race 104.

To shift from the one-way mode to the locked mode: actuator A rotates cage 108 and ramp 118A in direction CD1; surface 120A contacts and slides along end 130A in direction CD1; ramp 118A pivots pawl 106A in direction PD2 against force F; surface 136A contacts and non-rotatably connects to wall 135; end 132A disengages from protrusion 138A; and ramp 118A prevents resilient element 110A and force F from pivoting pawl 106A in direction PD1.

To shift from the one-way mode to the freewheel mode: actuator A rotates cage 108 and ramp 118A in direction CD1; surface 120A contacts pawl 106A and slides along end 130A in direction CD1; ramp 118A pivots pawl 106A in direction PD2 against force F; end 132A disengages from protrusion 138A; and surface 136A remains free of contact with wall 135. As noted above, force F urges end 130A into contact with ramp 118A, fixing the position of pawl 106A about axis PA.

To shift from freewheel mode to the locked mode: actuator A rotates cage 108 and ramp 118A in direction CD1; surface 120A slides along end 130A in direction CD1; ramp 118A pivots pawl 106A in direction PD2 and against force F; surface 136A contacts and non-rotatably connects to wall 135; end 132A compresses resilient element 110A and remains free of contact with outer race 104 and protrusions 138; and ramp 118A prevents resilient element 110A and force F from pivoting pawl 106A in direction PD1.

To shift from the freewheel mode to the one-way mode: actuator A rotates cage 108 and ramp 118A in direction CD2; surface 120A slides along end 130A in direction CD2; ramp 118A disengages from pawl 106A; resilient element 110A and force F pivot pawl 106A in direction PD1; end 132A contacts surface 140A of protrusion 138A; and surface 136A remains free of contact with wall 135.

In the locked mode, portion 146 of ramp surface 120A contacts pawl 106A. In the freewheel mode, portion 148 of ramp surface 120A contacts pawl 106A. Portion 146 is larger than portion 148.

In an example embodiment, at least a portion of wall 135 is located radially outwardly of protrusions 138 and is axially offset from protrusions 138. In an example embodiment, outer race 104 includes protrusions 150 and groove 134 is axially disposed between protrusions 138 and 150. Protrusions 150 mirror protrusions 138. Therefore, for example, in the one-way mode, ends 132 contact respective pair of protrusions 138 and 150.

In the example of FIGS. 1-13, clutch 100 is shown with four each of: pawls 106; resilient elements 110; and ramps 118. However, it should be understood that other numbers of pawls 106; resilient elements 110; and ramps 118 of clutch 100 are possible.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

A actuator
AR axis of rotation
AD1 axial direction
AD2 axial direction
CD1 circumferential direction
CD2 circumferential direction
F force
L1 line
M material, outer race
PA pivot axis
PD1 pivot direction
PD2 pivot direction
RD radial direction
T1 torque
T2 torque
T3 torque
T4 torque
100 switchable ratcheting clutch
102 inner race
104 outer race
106 pawl
106A pawl
108 cage
110 resilient element
110A resilient element
111 indentation, inner race
112 pocket, inner race
112A pocket, inner race
114 portion, pawl
114A portion, pawl
115 solid portion, cage
116 strip portion, cage
117 opening, cage
117A opening, cage
118 ramp, cage
118A ramp, cage
119 radially outer surface, inner race
120 ramp surface
120A ramp surface
122 end, ramp
122A end, ramp
124 angle
126 angle
128 angle
130 circumferential end, pawl
130A circumferential end, pawl
132 circumferential end, pawl
132A circumferential end, pawl
134 circumferentially disposed groove, outer race
135 wall, groove
136 surface, pawl
136A surface, pawl
138 protrusion, outer race
138A protrusion, outer race
140 surface, protrusion
140A surface, protrusion
142 surface, protrusion
144 surface, protrusion
146 portion, ramp surface
148 portion, ramp surface
150 protrusion, outer race

The invention claimed is:

1. A switchable ratcheting clutch, comprising:
an axis of rotation;
an inner race including a pocket;
an outer race;
a cage radially disposed between the inner race and the outer race and including a ramp sloping radially inwardly in a first circumferential direction; and,
a pawl including a portion:
  disposed in the pocket; and,
  pivotable within the pocket, wherein:
    in a locked mode of the switchable ratcheting clutch:
      the pawl contacts the outer race; and,
      the pawl, the inner race, and the outer race are non-rotatably connected;
    in a one-way mode of the switchable ratcheting clutch:
      the pawl contacts the outer race; and,
      relative rotation of the inner race around the axis of rotation and with respect to the outer race is enabled only in a second circumferential direction, opposite the first circumferential direction; and,
    in a freewheel mode of the switchable ratcheting clutch:
      the ramp contacts the pawl;
      the pawl is free of contact with the outer race; and,
      the inner race is rotatable around the axis of rotation and with respect to the outer race in the first circumferential direction and in the second circumferential direction.

2. The switchable ratcheting clutch of claim 1, wherein:
the ramp is:
  in contact with the pawl in the locked mode; and,
  free of contact with the pawl in the one-way mode; and,
the cage is arranged to be rotated, around the axis of rotation and with respect to the inner race, by an actuator to switch the switchable ratcheting clutch among the locked mode, the one-way mode, and the freewheel modes.

3. The switchable ratcheting clutch of claim 1, wherein:
the outer race includes a circumferentially disposed groove bounded circumferentially and radially outwardly by a wall in a material forming the outer race;
a surface of the pawl is located in the circumferentially disposed groove; and,
in the locked mode, the surface of the pawl contacts the wall.

4. The switchable ratcheting clutch of claim 3, wherein:
the outer race includes a plurality of protrusions extending radially inwardly;
in the one-way mode, the pawl contacts a protrusion included in the plurality of protrusions; and, the wall:
  extends radially outward past the plurality of protrusions; and,
  is axially off-set from the plurality of protrusions.

5. The switchable ratcheting clutch of claim 1, further comprising:
  a resilient element engaged with the inner race and the pawl, wherein:
    the pawl includes a pivot axis parallel to the axis of rotation, passing through the portion of the pawl, and passing through the pocket;
    the outer race includes a plurality of protrusions extending radially inwardly;
    in the one-way mode, the resilient element urges the pawl about the pivot axis and into contact with a protrusion included in the plurality of protrusions;
    in the freewheel mode, the resilient element urges the pawl about the pivot axis and into contact with the ramp; and,
    the cage is arranged to be rotated, around the axis of rotation and with respect to the inner race, by an actuator to switch the switchable ratcheting clutch among the locked mode, the one-way mode, and the freewheel modes.

6. The switchable ratcheting clutch of claim 5, wherein:
  the resilient element urges the pawl about the pivot axis with a force; and,
  the force and the contact between the pawl and the ramp fix a position of the pawl about the pivot axis.

7. The switchable ratcheting clutch of claim 1, wherein:
  in the locked mode, a first portion of the ramp contacts the pawl;
  in the freewheel mode, a second portion of the ramp contacts the pawl; and,
  the first portion is larger than the second portion.

8. The switchable ratcheting clutch of claim 1, wherein in the one-way mode, the inner race is non-rotatably connected to the outer race for:
  a torque applied to the inner race in the first circumferential direction; or,
  a torque applied to the outer race in the second circumferential direction.

9. The switchable ratcheting clutch of claim 1, wherein:
  the pawl includes a first circumferential end and a second circumferential end;
  the outer race includes a plurality of protrusions extending radially inwardly;
  in the locked mode, the first circumferential end contacts the outer race; and,
  in the one-way mode, the second circumferential end contacts the plurality of protrusions.

10. The switchable ratcheting clutch of claim 1, wherein:
  the outer race includes a plurality of protrusions extending radially inwardly;
  a protrusion in the plurality of protrusions includes a first surface facing at least partly in the second circumferential direction; and,
  in the one-way mode and for rotation of the inner race in the first circumferential direction, the pawl contacts the first surface of the protrusion included in the plurality of protrusions.

11. The switchable ratcheting clutch of claim 1, wherein the switchable ratcheting clutch is arranged to transition to the one-way mode from the locked mode or from the freewheel mode for relative rotation of the inner race, with respect to the outer race, in the first circumferential direction.

12. A switchable ratcheting clutch, comprising:
  an axis of rotation;
  an inner race including a pocket;
  an outer race;
  a cage:
    radially disposed between the inner race and the outer race; and,
    including a ramp sloping radially inwardly in a first circumferential direction around the axis of rotation; and,
  a pawl including:
    a portion disposed in the pocket and pivotable around a pivot axis parallel to the axis of rotation and passing through the portion;
    a first circumferential end; and,
    a second circumferential end, wherein:
      in a locked mode of the switchable ratcheting clutch:
        the ramp contacts the pawl;
        the first circumferential end contacts the outer race; and,
        the inner race and the outer race are non-rotatably connected;
      in a one-way mode of the switchable ratcheting clutch:
        the second circumferential end contacts the outer race; and,
        relative rotation of the inner race around the axis of rotation and with respect to the outer race is enabled only in a second circumferential direction, opposite the first circumferential direction;
      in a freewheel mode of the switchable ratcheting clutch:
        the pawl is free of contact with the outer race; and,
        the inner race is rotatable, with respect to the outer race, in the first circumferential direction and in the second circumferential direction; and,
      the cage is arranged to be rotated, around the axis of rotation and with respect to the inner race, by an actuator to switch the switchable ratcheting clutch among the locked mode, the one-way mode, and the freewheel modes.

13. The switchable ratcheting clutch of claim 12, further comprising:
  a resilient element:
    in contact with the pawl and with the inner race; and,
    urging the pawl around the pivot axis, wherein in the one-way mode, the resilient element urges:
      the second circumferential end into contact with the outer race; and,
      the first circumferential end out of contact with the outer race.

14. The switchable ratcheting clutch of claim 13, wherein the portion of the pawl is circumferentially disposed between the ramp and the resilient element.

15. The switchable ratcheting clutch of claim 12, wherein:
  in the locked mode, a first portion of the ramp contacts the pawl;
  in the freewheel mode, a second portion of the ramp contacts the pawl; and,
  the first portion is larger than the second portion.

16. The switchable ratcheting clutch of claim 12, wherein in the one-way mode, the ramp is free of contact with the pawl.

17. The switchable ratcheting clutch of claim 12, wherein:
  the outer race includes a circumferentially disposed groove bounded circumferentially and radially outwardly by a wall in a material forming the outer race;

in the locked mode, the first circumferential end contacts the wall; and, in the one-way mode, the first circumferential end is free of contact with the wall.

18. The switchable ratcheting clutch of claim 12, wherein:

the outer race includes a plurality of protrusions extending radially inwardly;

a protrusion included in the plurality of protrusions includes a first surface facing at least partly in the second circumferential direction; and, in the one-way mode and for rotation of the inner race in the first circumferential direction, the second circumferential end contacts the first surface of the protrusion included in the plurality of protrusions.

19. The switchable ratcheting clutch of claim 12, wherein:

the outer race includes a circumferentially disposed groove bounded circumferentially and radially outwardly by a wall in a material forming the outer race;

the outer race includes a plurality of protrusions extending radially inwardly;

in the one-way mode, the second circumferential end contacts the plurality of protrusions;

in the locked mode, the first circumferential end contacts the wall; and, the wall is axially off-set from the plurality of protrusions.

20. A switchable ratcheting clutch, comprising:

an axis of rotation;

an inner race including a pocket and a radially outermost surface;

an outer race;

a cage:
  radially disposed between the inner race and the outer race; and,
  including a ramp sloping radially inwardly in a first circumferential direction;

a pawl including:
  a portion pivotably disposed in the pocket;
  a first circumferential end; and,
  a second circumferential end; and, a resilient element:
  in contact with the inner race and the first circumferential end; and,
  urging the pawl around a pivot axis passing through the portion of the pawl and parallel to the axis of rotation, wherein:
    in a locked mode of the switchable ratcheting clutch:
      the cage is in a first circumferential position around the axis of rotation and with respect to the inner race;
      the ramp contacts the pawl;
      the second circumferential end of the pawl contacts the outer race; and,
      the inner race and the outer race are non-rotatably connected;
    in a one-way mode of the switchable ratcheting clutch:
      the cage is in a second circumferential position around the axis of rotation and with respect to the inner race;
      the first circumferential end of the pawl contacts the outer race; and,
      relative rotation of the inner race around the axis of rotation and with respect to the outer race is enabled only in a second circumferential direction, opposite the first circumferential direction;
    in a freewheel mode of the switchable ratcheting clutch:
      the cage is in a third circumferential position around the axis of rotation and with respect to the inner race;
      the ramp contacts the pawl; and,
      the inner race is rotatable with respect to the outer race in the first circumferential direction and in the second circumferential direction; and,
    the cage is arranged to be rotated, around the axis of rotation and with respect to the inner race, by an actuator to switch the switchable ratcheting clutch among the locked mode, the one-way mode, and the freewheel modes.

* * * * *